United States Patent
Barnes

[11] 3,980,107
[45] Sept. 14, 1976

[54] HELICALLY WOUND TUBULAR WALL MATERIAL

[75] Inventor: Donald E. Barnes, Minnetonka, Minn.

[73] Assignee: Champion International Corporation, Stamford, Conn.

[22] Filed: May 8, 1975

[21] Appl. No.: 575,635

[52] U.S. Cl. .............................. 138/143; 138/144; 138/150
[51] Int. Cl.² .......................................... F16L 9/16
[58] Field of Search .......... 138/143, 144, 141, 150; 428/461, 36

[56] References Cited
UNITED STATES PATENTS

| | | | |
|---|---|---|---|
| 2,355,584 | 8/1944 | Douglas | 138/144 |
| 3,037,529 | 6/1962 | Hancik | 138/141 |
| 3,390,704 | 7/1968 | Woodell | 138/143 |

Primary Examiner—Richard E. Aegerter
Assistant Examiner—L. Footland
Attorney, Agent, or Firm—Evelyn M. Sommer

[57] ABSTRACT

This application describes a tubular container wall material of particular use in the packaging of dry and liquid products such as hydroscopic food products, and liquid foods. This wall material comprises an inner portion of liner ordinarily composed of four adherent plies of polyester-polyolefin-metal foil-heat seal coating-which liner bonds through the heat seal coating to an outer portion of rigidity-imparting material. This composite wall material constitutes the tubular wall for a container and is formed by winding elongate strips of its constituent plies onto a mandrel where they are bonded into an integral structure, for example, by heating. The can or container itself may then be formed by cutting the resultant tubular structure into appropriate lengths and attaching end closure means thereto.

4 Claims, 3 Drawing Figures

HELICALLY WOUND TUBULAR WALL MATERIAL

BACKGROUND OF THE INVENTION

Helically wound, rigid, non-metallic tubular container wall materials having a foil interior surface and adapted with closure members secured to either end are well-known in the art. The use of these non-metallic wound containers in lieu of essentially metallic cans and other packaging forms offers a considerable savings in material costs.

Containers of this type have generally been made by successively winding webs of metallic foil or foil laminate and then rigidity and structure imparting material helically onto a mandrel to form a layered tubular wall member. A laminate such as a metallic foil-paper has most often been used as the inner, liner material rather than the heavy gauge unsupported foil web which would otherwise be required.

Containers of the foregoing type, however, often fail to withstand attack from corrosive contents in the absence of a protective coating applied to the innermost foil or foil-laminate surface. Additionally, abrasive contents have been known to destroy laminated coating on the inner metallic foil surface so as to expose the metal and render such laminates ineffective.

A further drawback in the use of the prior art metallic foil and foil-laminate liners attend the production of these tubular wall materials in the successive, helically winding onto a mandrel. Because the wound tube must rotate relative to, and be slidingly removable from, the mandrel, it is essential that the mandrel-contacting ply of the wall material be of low frictional resistance.

In the prior art, however, the metallic foil and metallic foil laminates have not provided the requisite low coefficient of friction on the mandrel. Accordingly, it has been necessary to apply a lubricant to the mandrel itself, or to the mandrel-contacting layer, before and continuously throughout the winding operation. Such lubrication has the disadvantage of requiring careful monitoring throughout the tube forming operation. Further, and particularly in instances wherein the container is intended for use in the canning of an edible material, such lubricant often constitutes an impurity which could cause contamination unless subsequently removed or otherwise rendered harmless.

In the prior art, the forming of a continuous barrier ply of the liner has also proven a problem. Often such ply has proven weak or discontinuous at the seam formed during winding or, in alternative construction, reinforced seams have interfered with proper seating of the end closure means of the container.

It is therefore an object of the present invention to overcome the foregoing drawbcks. Additionally, the present invention provides such other advantages as are hereinafter described.

DESCRIPTION OF THE INVENTION

The composite tubular wall material of this invention consists essentially of an inner surface layer comprising a multi-ply liner material and an outer rigidity and structure imparting layer ordinarily comprising one or more plies of paperboard or paperboard and plastic laminate. These layers are united into the tubular wall material by successively forming the layers on a mandrel where they are wound in helical fashion and integrally bonded. Once united, the tube may be removed from the mandrel and cut into lengths appropriate to the desired size of the container. Thereafter, a closure means may be applied at one end of each length, the resultant receptacle filled, and then a second closure means applied to the other end to obtain a filled and tightly enclosed container.

The production of the composite tubular wall material on the mandrel may be understood by focusing upon the manner in which any one of the present plies is formed on the mandrel. Accordingly, an elongate strip of the ply material is advanced longitudinally from, for example, a supply roll toward the mandrel. This approach is made at a suitable lead angle, relative to the central axis of the mandrel, to form a continuous ply as the strip is wound around and helically wraps the mandrel. The continuous nature of the ply is ensured by the lead angle which causes successive opposite edges of the elongate strip to be laid at least contiguously, and alternatively overlappingly, along the surface of the mandrel.

In order to effect the advance of the elongate strip toward the mandrel, and to cause it to be wound thereon, the portion of ply already formed from the strip is caused to rotate relative to, and simultaneously progress along the axis of, the mandrel. Preferably, the mandrel is maintained stationary, and in such case the force applied to the ply causes additional lengths of the strip to be pulled toward the mandrel and wound thereon to yield further production of the tubular ply.

As previously indicated, the foregoing particular description is directed to but a single, of the two or more, strip of material which is successively wound upon the mandrel to produce the various plies and layers of the present tubular wall material. The other plies or layers of the composite body member are, however, applied in the same manner, but successively, by similar advancement of additional elongate strips of materials. These additional strips are, however, advanced at points on the mandrel adjacent to the point of application of the first or underlying strip and are super-imposed peripherally upon the tubular ply or plies already formed by winding on the mandrel.

The foregoing manner in which the present tubular wall material is formed, as well as apparatus suitable therefor, are conventional in the art, and thus the steps of strip advance and winding do not constitute a portion of the present invention. Attention is therefore directed to U.S. Pat. No. 3,457,130 of Morrison, U.S. Pat. No. 3,371,841, of O'Neill, and U.S. Pat. No. 3,520,463 of Ahlemeyer which are hereby incorporated herein by reference, as if they were set forth at length, to more fully describe such steps and apparatus as are suitable for use in accordance with the present invention.

It is the liner of the present tubular wall material which is most essential to overcoming the drawbacks and inadequacies in the prior art mentioned hereinabove. This liner, or inner surface layer as opposed to the outer rigidity and structural imparting layer, is the layer of the tube which imparts the desired barrier properties to vapour and moisture as well as protection against corrosion and other adverse effects, which might impair or destroy materials packaged in the containers. Partially to supply these desired characteristics and properties, the liner includes a metallic foil. This foil is preferably composed of aluminum and should be provided in a thickness of from about 0.275 to 1 mil., most preferably about 0.35 mil. It is primarily responsible for the fluid impenetrability of the present body members.

One surface of the metallic foil, and representing the surface of the liner which will eventually be innermost in the container, there is provided a ply of polyester, for example, a polyethylene glycol terephthalate such as Mylar. This ply should exhibit excellent characteristics, of tensile strength and abrasion resistance so as to provide adequate protection against attack by the eventual contents of the present container. Additionally, it should exhibit a thickness of from about 0.48 to 1 mil. of thickness and should be strongly attached to the aluminum foil.

Strong, direct attachment of polyester and metallic or aluminum foil is not readily obtained. Accordingly, in a preferred embodiment of the present invention, there is provided a ply of adhesive material intermediate between, and bonding, the aluminum foil and polyester plies of the liner. In a most preferred embodiment, this intermediate layer comprises low density polyethylene in a thickness of from about 0.5 to 1 mil. Alternatively, however, other adhesives as are known in the art—for example, polyurethane adhesive primer—may be substituted for the polyethylene. These alternatives are not normally as desirable, however, because they do not provide the additional cushioning effect for the foil which low density polyethylene has been discovered to exhibit.

On the other surface of the aluminum foil, there is provided another adhesive ply suitable for uniting the metallic foil with the rigidity and structure imparting layer of the tubular wall material. The composition of this adhesive is not critical, and may be selected from conventional materials. Thus, for example, this ply may also be composed of low density polyethylene.

Desirably, however, this ply should comprise a heat-seal coating, so as to provide effective and ready bonding of the liner material to the outer layer of the tube. Thus, for example, it may be composed of a modified polyester or other polymer recognized for its good heat-seal characteristics and is ordinarily provided as an emulsion, or solution of suitable polymer and in a thickness of from about 2 to 10 pounds per 3000 square foot ream, dependent upon the polymer solids content of the composition applied to the aluminum foil.

In addition to giving improved adhesion of the metallic foil to the outer rigidity and structure imparting layer of the tubular wall material or tube, these heat seal coatings provide a solution to the problem of how to seam the contiguous edges of the metal foil or remaining liner material. This problem has long escaped solution because of the countervailing objectives desired of the seam.

Thus, because it is secure and relatively impenetrable, a helically wound liner which has been edge-to-edge fin sealed and folded under has been favored in the art. Unfortunately, however, such fin seal folds result in a seam which — due to its triple liner thickness — may prevent proper attachment of end closure means. The containers of the prior art have also been inadequate where a butt seam has been utilized for the liner. There, the seam often exhibited barrier leakage, thus, for example, requiring sealing with a separately applied bead of adhesive or bonding agent.

Pursuant to use of the heat seal coating of the present invention, however, excellent lap seams can be produced without additional steps. Thus it has been discovered that such coatings are self sealing under the preferably elevated temperature and pressure of winding on the mandrel. Therefore, according to this preferred embodiment of the invention, seams of less thickness and adequate barrier characteristics may be produced without complicated and/or additional steps.

The multi-and preferably four-ply liner described hereinabove offers a considerable structural improvement over those customarily employed in the prior art. It has also been discovered, however, that through the selection of polyester as the innermost and surface ply of this liner, a further advantage arises incident to the production of the present tubular wall material. More particularly, it has been discovered that certain of the commercially available polyesters exhibit a sufficiently low coefficient of friction under the conditions of winding on the mandrel utilized in accordance with the present invention, as to permit the elimination of the lubricants heretofore utilized to ensure the slidingly disengageability and rotatability of tubes formed on the mandrel.

Thus, in accordance with the present invention, the polyester surface ply of the liner should be selected from materials which exhibit a coefficient of friction of less than about 0.30 at 250° F, most preferably, a coefficient of friction of from about 0.24 to about 0.30 at such temperature. In this manner, the present tubular wall materials may be produced without resort to lubrication between the mandrel and the mandrel-contacting ply of the liner.

The outer, structure and rigidity imparting layer of the tubes may be composed of such polymer, paperboard, polymeric coated paperboard or other materials as have heretofore been utilized in the prior art. Also, it may be composed of from one to as many different adherent plies as are described. Thus, all that is required of this layer is that it exhibit sufficient rigidity substantially to maintain the tubular structure of the wall material for the present containers.

Additional features and benefits of the invention will be apparent from the following description with reference to the drawings in which.

Figure 1:
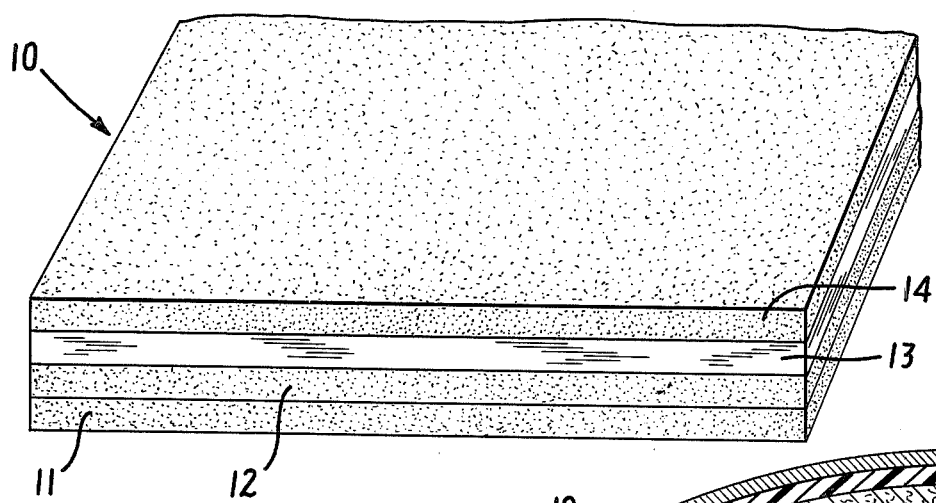
FIG. 1 is an enlarged diagrammatic view of the liner material.

In accordance with the present invention, liner material 10, shown in detail in FIG. 1, is composed of a polyester inner surface ply 11 bonded through a polyethylene adhesive layer 12 to an aluminum foil layer 13. A heat seal coating of, for example, a polyethylene terephthalate modified vinyl lacquer constitutes fourth ply 14 covering the opposite surface of the aluminum foil.

Figure 2:
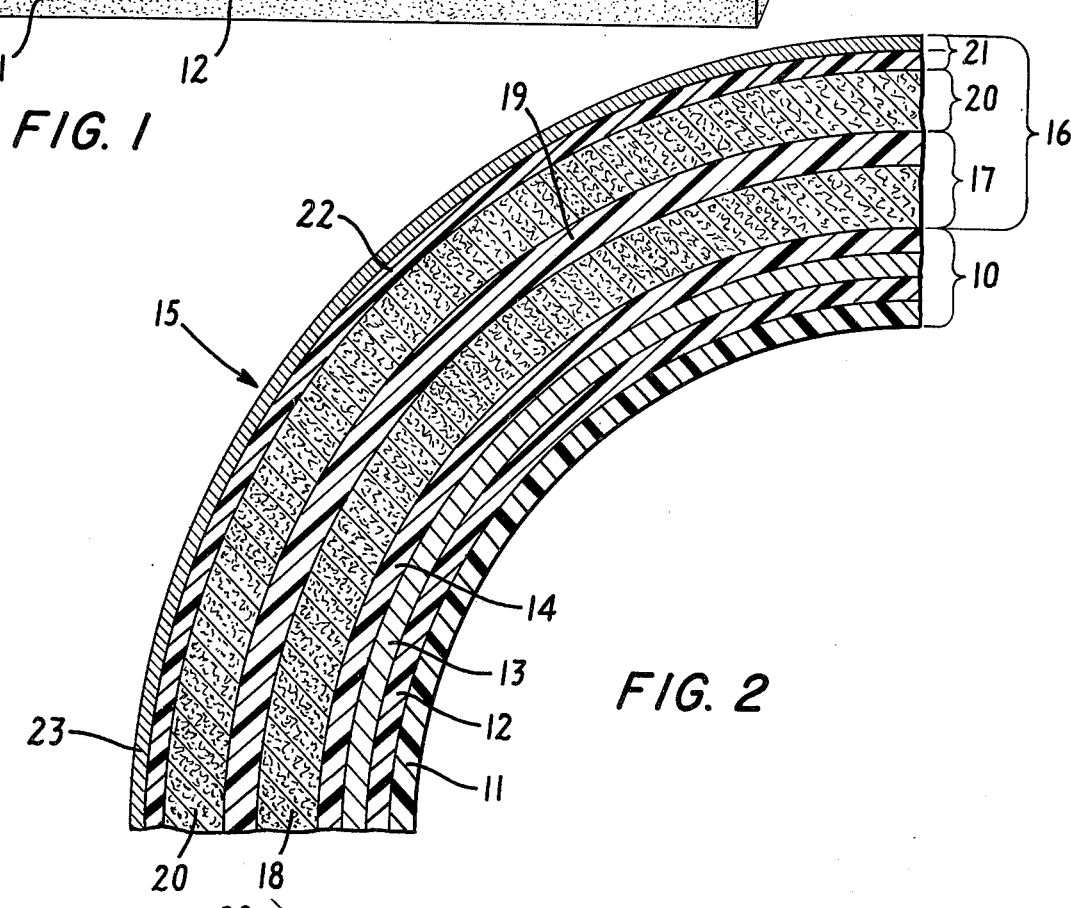
FIG. 2 is an enlarged fragmentary transverse section through a container wall material fabricated with the liner material of FIG. 1.

The composition of the wall of the tube 15 is depicted in FIG. 2 wherein the innermost four plies of this construction collectively represent liner 10 which is bonded to a rigidity and structure imparting layer 16. The liner is adhered through its heat seal coating 14 to a sub-laminate 17 composed of a paperboard ply 18 and attached polyethylene ply 19. Sub-laminate 17 of layer 16 is secured to sub-laminate 20 through bonding of polyethylene ply 19. The remainder of sub-laminate 20 comprises a second paperboard layer. Finally, outer layer 21 represents a paper label 23 adhesively laminated with adhesive ply 22 to the outer periphery of the tube 15.

Figure 3:
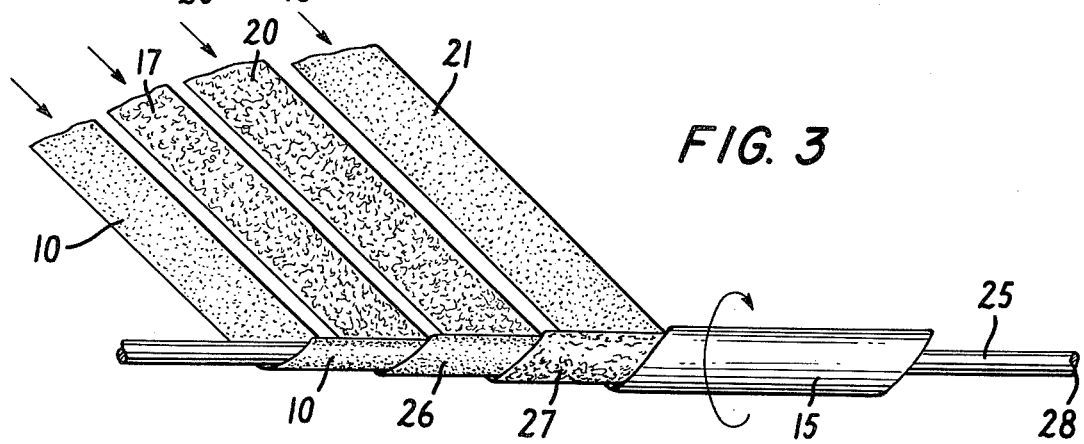
FIG. 3 is a schematic view of the spiral winding operation employed in the practice of the method of the present invention.

In FIG. 3, there is depicted the preferred manner of making the composite tubular wall material 15. Liner 10 is first fed onto stationary mandrel 25 at a suitable lead angle, relative to the axis of the mandrel, to effect helical overlap wrapping in continuous fashion. Adjacent and parallel to liner 10, sublaminate 17 composed of a coating of polyethylene adherent to a ply of fiberboard is fed toward the mandrel and wrapped over previously wrapped liner 10. Sub-laminate 17 is oriented so that its paperboard ply 18 will contact liner 10 and permit bonding thereto through the heat seal surface coating 14. Lateral of sub-laminate 17 is sub-laminate 20 composed of paperboard. The last lateral ply 23 comprises a paper label to which adhesive ply 22 has been added which fastens it to the surface of ply 20.

Proper feeding of strips 10, 17, 20 and 21 as well as progression of wound tube 15 laterally on mandrel 25 may be accomplished by means (not shown) well-known in the art. It is merely necessary that such means provide a parallel helically directed force to this wall material 15.

As the four elongated strips 10, 17, 20 and 21 are wound about mandrel 25, there are produced, consecutively and respectively, innermost layer 10 which is a tubular liner portion of the present wall material 15. Composition 26 comprising inner liner 10 having a continuous layer or ply of sub-laminate 17 superimposed thereon; tubular composition 27 comprising the consecutively wound tubular layers of liner 10, sub-laminate 17 and sub-laminate 20; and finally the preferred tubular wall material 15 of the present invention which additionally contains label 21 adherently affixed to composition 27.

As the elongated strips 10, 17, 20 and 21 are wound upon mandrel 25, completed tubular wall material 15 will extend in length and may be drawn off end 28 of the mandrel. Once it extends beyond this end, it may be cut into appropriate lengths with, for example, a flying saw (not depicted) and thereafter further processed into completed containers by, for example, affixing a closure member at one end thereof, filling the resultant receptacle with the material intended to be packaged and finally closing the other end of the receptacle with a second end closure means.

Because the wall material 15 is removed from the mandrel, however, it is necessary to ensure that each of the elongate strips 10, 17, 20 and 21 have been fixedly adhered to its respectively contacted sheets so as to ensure the integrity of the unsupported composite tube. This may be performed by any number of means well-known and conventional in the prior art. In a preferred embodiment of the present invention, however, and where as previously described in connection with both FIGS. 2 and 3 each surface of elongated strips 10 and 17 which contacts another strip is coated with polyethylene or other heat seal coating composition, adhesion is ensured by subjecting the liner and laminates to sufficient heat to provide bonding. This heating may, for example, be accomplished by maintaining mandrel 25 at a suitably elevated temperature. In addition, or optionally, one or more of elongate strips 10 and 17 may be subjected to a pre-heating step prior to being wrapped about mandrel 25 by for example, passing such strip over a platen or other heating element (not shown) immediately before it is wrapped about the mandrel.

EXAMPLE NO. 1

A four-ply liner of polyester/polyolefin/aluminum/- heat sealant and exhibiting excellent barrier and strength characteristics was prepared. The polyester film was 0.5 mil. Celanar a trade name of Celanese Plastics Company having a coefficient of friction of 0.27 at 250°F and the aluminum film was a foil of 0.35 mil. thickness.

Elongate strips of the films were pretreated by corona discharge and then adhered by a sandwich extrusion technique wherein molten polyethylene was extruded at 600°F between the two moving film strips as they were brought together. This polyethylene — which constituted an intermediate 0.5 mil. polyolefin ply — had a density of 0.918.

After cooling this sandwiched extrudate, a heat seal layer (Proxseal L9143P, an ethylene vinyl acetate and wax combination sold by Pierce and Stevens) was coated over the aluminum foil surface in a thickness of 3.0 lb./3000 sq. ft. ream. The liner was then dried, rolled, and stored for later use. (The bonding of the heat seal layer to the aluminum foil can be improved by applying a conventional shellac washcoat to the foil surface prior to the application of the heat seal layer.)

EXAMPLE NO. 2

A second liner material was prepared by the process of Example 1 as far as the polyester to foil lamination. The foil was primed with a polyurethane primer prior to the application of the heat sealer layer. The primed side of the foil was then extrusion coated with 8 lbs./3000 sq. ft. of Proxmelt E-4080 sold by Pierce and Stevens to improve the bonding of the liner at the butt joints of the can body.

EXAMPLE NO. 3

The liner produced in Example 1 was utilized as the inner surface protective layer of a dry bonded can wall material. The tubular wall was produced by successive feeding the liner, two separate sheets of paperboard (the first one coated on both surfaces with low density polyethylene) and then a label with adhesive applied to it onto the heated, stationary mandrel of a conventional can rolling apparatus.

Each of the lateral edges of the liner and sheets was laid contiguously on the mandrel or underlying ply, respectively. Thus instead of forming crimps and foldbacks at the seams spiraling down the can surfaces, the laminates exhibited simple lap bonded seams which minimized the thickness differential from the rest of the can wall. Also each liner or sheet was positioned to stagger the seams formed respectively thereby so as to increase the structural strength of the wall material.

EXAMPLE NO. 4

The process of Example 3 was repeated except that a sheet of paperboard coated only on the outer surface with low density polyethylene was substituted for the first coated sheets there utilized. The substituted sheet was positioned so that the liner adhered to the non-coated surface of the paperboard.

The resultant structure exhibited substantially the same excellent characteristics and properties as those of Example 3. In addition, the direct contact of the liner's heat seal ply with paperboard eliminated the occasional slippage or positioning problems which were encountered during formation where bonding of the heat seal coating to a polyethylene ply was performed.

While for purposes of illustration, specific designs, dimensions and compositions have been referred to herein, it should be understood that quite a broad range of specifications are adaptable to the products, apparatus and processes of this invention. There are numerous other modifications available within the scope of this invention and the appendant claims.

I claim:

1. In a helically wound tubular wall material comprising an inner continuous layer of barrier liner material and an adherent outer continuous layer of rigidity and structure imparting material, the improvement which comprises a liner composition comprising a metal foil, a polyester film having a coefficient of friction of less than 0.3 at 250°F. bonded to one surface of said metal foil through an intermediate ply of low density polyethylene or polyurethane adhesive and a heat sealable coating bonded to the other surface of said foil.

2. The tubular wall material of claim 1 wherein the inner continuous layer exhibits a lap seam at the contiguously opposite edges of the helically wound liner.

3. The tubular wall material of claim 2, wherein the lap seam is sealed solely with the heat sealable coating bonded to said foil.

4. The tubular wall material of claim 1 wherein said outer layer comprises paper board and said heat sealable coating directly contacts and adheres to said paper board.

* * * * *